Patented Oct. 31, 1933

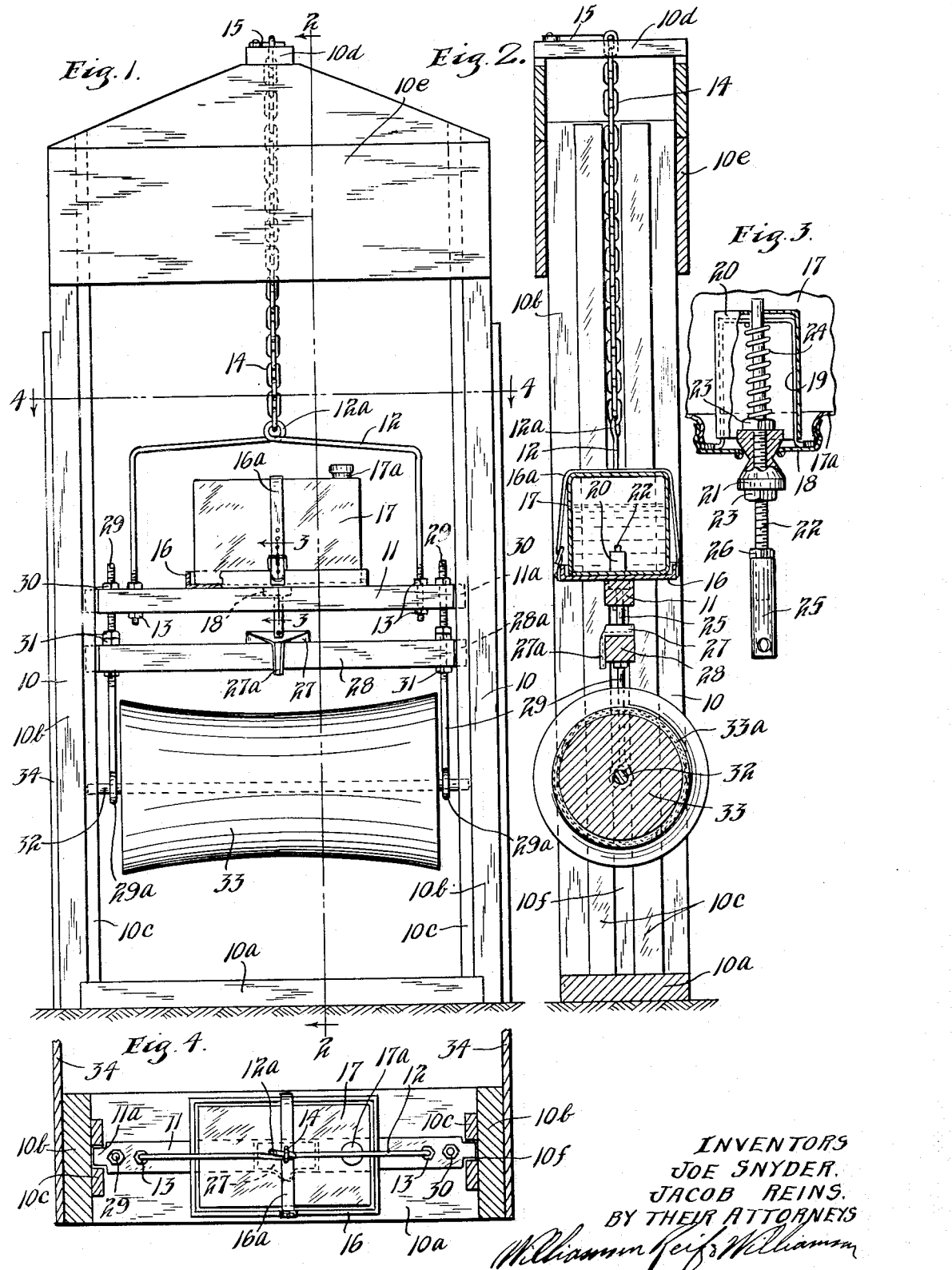

1,933,071

UNITED STATES PATENT OFFICE 1,933,071

HOG OILER

Jacob Reins and Joe Snyder, Iroquois, S. Dak.

Application February 4, 1928. Serial No. 251,878

3 Claims. (Cl. 119—157)

This invention relates to a device for treating animals such as hogs, with solution. It is now more or less common to apply various oils and other solutions to the hogs for improving the condition of the skin thereof and correcting ailments thereof. It is desirable to have a device which will be more or less automatic in the treatment of the animals and by which they may be treated by merely passing through the device.

It is an object of this invention, therefore, to provide a simple and efficient device by means of which the treating solution can be easily and quickly and effectively applied to the animal.

It is another object of the invention to provide a device for applying solution to the animal comprising a member having an endless periphery with which the animal contacts, said device also having means for applying solution to said member, which means preferably is operated by movement of said member.

It is a further object of the invention to provide a device for applying solution to animals comprising a frame having a movable member mounted therein, which member has a periphery adapted to be engaged by the animal, a receptacle for holding the treating solution, and means for dispensing the solution from the receptacle to said member, preferably operated by movement of said member, which dispensing means will be rendered inoperative if said member is held in elevated position, as when an animal stops thereunder.

These and other objects and advantages of the invention will be fully set forth in the following description made in connection with the accompanying drawing, in which like reference characters refer to similar parts throughout the several views and in which:—

Fig. 1 is a view in front elevation of the device, a small portion thereof being broken away and another portion shown in vertical section;

Fig. 2 is a vertical section taken on line 2—2 of Fig. 1;

Fig. 3 is a vertical section taken substantially on line 3—3 of Fig. 1; and

Fig. 4 is a horizontal section taken on line 4—4 of Fig. 1, said sections being taken as indicated by the arrows.

Referring to the drawing, a device is shown comprising a frame 10 having the base member 10a to which are secured the standards 10b, said standards being connected at the top by a housing 10c comprising a transverse bar 10d. The standards 10b have spaced strips 10e at their inner sides forming a guideway 10f therebetween. An auxiliary frame comprising a bar 11 is provided, which extends between the standards 10b and has tongues 11a at each side fitting and slidable in the guideways 10f. The bar 11 is carried by a yoke 12 formed of a rod having vertical side portions the terminals of which are threaded and extend through said bar and are secured thereto by the nuts 13. The member 12 has an eyelet 12a at its top central portion engaged by the lower link of a chain 14, which chain extends upwardly through the bar 10d, and a link thereof is engaged by a hook 15 pivoted to the top bar 10d. A pan 16 is carried on top of bar 11 adapted to receive and hold a can or receptacle 17 in which the treating solution is carried, said can being shown as having a cap equipped filling portion 17a. The receptacle 17 is held in place by the strap 16a connected to pan 16. The bar 11 has secured therein a comparatively small cylindrical pan 18 adapted to receive the liquid discharged from the can 17. The pan 18 has a yoke member 19 substantially of inverted U-shape, extending upwardly therefrom adapted to position an inverted cylindrical member 20 having an open lower end disposed some distance above the bottom of pan 18. The pan 18 has a central opening therein, edge of which is shown as being provided with a bead and the valve 21 is adapted to co-operate with this opening. The valve 21 is carried centrally on a rod 22 which is threaded therein, said valve being positioned on said rod by the nuts 23. The rod 22 extends upward through members 19 and 20 and a coiled spring 24 surrounds said rod, engaging the top of yoke 19 at one end and the upper nut 23 at its other, this spring thus normally tending to hold the valve 21 in the position shown in Fig. 3. It will be seen that the valve 21 is bi-conical in shape, having its narrower portion disposed in the opening in the bottom of pan 18. A tubular member 25 is secured to the lower end of the rod 22 and adjustably held thereon, the same being engaged by a jamb nut 26 threaded on said rod. The tube 25 is disposed over a receptacle or funnel 27 having a depending spout 27a extending through a bar 28 which also extends between standards 10b and has tongues 28a at its sides adapted to move in the grooves 10f. The bar 28 is adjustable relatively to bar 11 and is suspended therefrom by rods 29 which extend through both bars, said rods being threaded and having the nuts 30 adjacent their upper ends engaging bar 11 and supporting said rods. Said rods are also equipped with nuts 31 at each side of the bar 28, which nuts determine the position of bar 28 thereon. The rods 29 extend below the bar 28 and are provided at their lower ends with the eyelets 29a. A rod or shaft 32 extends through and between the eyelets 29a and has its ends movable in the grooves 10f. A member 33 is journaled on the shaft or rod 32, which member is shown in the form of a roller having a concave periphery. The periphery of roller 33 will be covered with some absorbent material 33a preferably of a fabric nature, such as burlap. Plates or boards 34 preferably will be disposed at each side of the standards 10b forming a passage or runway for the animals.

In operation the solution to be applied to the animals will be placed in the receptacle 17 and the same will be disposed in the pan 16 with its discharge spout 17b directed downwardly in the pan 18. The solution can thus pass downwardly and around the lower edge of the cylindrical member 20 and to the opening in pan 18. This opening is normally held closed by the spring 24 forcing the upper portion of valve 21 into said opening. A certain amount of the solution will be placed on the roller 33 and the machine will be ready for operation. The hogs or other animals to be treated will be directed through the passageway formed by the members 34 and between the standards 10b. The animals will pass under the roller 33, raising the same, and also rotating the roller as they pass thereunder. The backs of the animals will thus come into firm engagement with the periphery of said roller and the solution which is on the covering 33a of the roller will be transferred to the backs of the animals. When the roller is raised by the animal passing thereunder, it raises rods 29 and bar 28. Member 27 will be raised and will engage the lower end of tube 25 and raise the same, thus raising rod 22 and valve 21. The narrow portion of the valve will be moved into the opening in the bottom of pan 18 and the solution will thus run out through said opening and down along said valve, rod 22 and tube 25. The solution will pass into member 27 and be directed by the spout 27a thereof downwardly on the roller 33. If the animal should stop beneath the roller 33 the lower portion of the valve 21 will be brought into the opening and the opening will thus be closed. Ordinarily the animal passes under the roller rather quickly and the rod 22 is given an up and down movement, thus permitting the solution to pass out through the opening in pan 18 in considerable quantity at two different times. The member 20 prevents an excessive discharge of the solution from receptacle 17. The roller 33 is thus kept well supplied with the solution. The amount of vertical movement of member 28 can be regulated by adjustment of the nuts 31 and 30. The height of the roller 33 can, of course, be varied by engaging different links of the chain 14 by the hook 15, and by adjustment of the nuts 13.

From the above description it is seen that applicant has provided a very simple and efficient animal treating machine. The animals are quickly and effectively supplied with a solution as they pass under the member which applies the oil or solution. The periphery of the member moves with the animal and the solution is effectively transferred to the animal. The device is quite simple in structure and can be made very rugged and durable.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device for supplying liquid to animals having in combination, a main frame comprising spaced standards having guideways at their adjacent sides, a bar suspended from said frame having guide means at its ends movable in said guide ways, a liquid containing receptacle carried on said bar, rods depending from the ends of said bar and supported thereon, a bar below said bar also having guide means movable in said guide ways and being adjustable in position relatively to said first mentioned bar and vertically movable relatively thereto, said rods depending from said last mentioned bar, a roller journaled in the lower ends of said rods having trunnions movable in said guide ways, and means operated by the upward movement of said bar, rods and roller for supplying liquid from said receptacle to said roller.

2. A device for applying treating liquid to animals having in combination, a frame defining a passage for animals to pass through, a horizontal bar mounted for vertical sliding movement in said frame, a second horizontal bar mounted for vertical sliding movement in said frame below said first mentioned horizontal bar, means for supporting said upper horizontal bar in a medial location with respect to said frame, said means being such as to limit downward movement of said upper bar but to permit upward movement within the limits of said frame, means connecting said lower bar to said upper bar, said connecting means being such as to limit the distance between said lower bar and said upper bar but to permit movement of said lower bar toward said upper bar, a horizontal roller located below and supported by said lower bar, a receptacle carried by said upper bar for containing liquid, a discharge in said receptacle, a valve which cooperates with said discharge, and means for actuating said valve responsive to movement of said lower bar with respect to said upper bar, said roller being adapted to receive treating liquid from said discharge and distribute the same.

3. A device for applying treating liquid to animals having in combination, a vertically disposed frame defining a passage for animals to pass through, a pair of horizontal bars each mounted for vertical sliding movement with respect to said frame, one of said bars being located above the other, an elongated, flexible supporting member connecting the upper one of said bars to the upper portion of said frame to limit downward movement of said upper bar and yet permit upward movement thereof, means connecting said lower bar to said upper bar to limit the space therebetween and yet permit movement of said lower bar toward said upper bar, a horizontal roller disposed below said lower bar and revolubly supported thereby, a receptacle having a discharge therein and adapted to contain liquid mounted on said upper bar, a valve in said discharge, and means for actuating said valve responsive to movement of said lower bar relative to said upper bar, said roller being adapted to receive treating liquid from said discharge and distribute the same.

JACOB REINS.
JOE SNYDER.